(12) United States Patent
Gauthier et al.

(10) Patent No.: US 11,250,139 B2
(45) Date of Patent: Feb. 15, 2022

(54) GREYBOX FUZZING FOR WEB APPLICATIONS

(71) Applicant: Oracle International Corporation, Redwood Shores, CA (US)

(72) Inventors: François Gauthier, Brisbane (AU); Behnaz Hassanshahi, Brisbane (AU); Benjamin Selwyn-Smith, Wellington (NZ)

(73) Assignee: Oracle International Corporation, Redwood Shores, CA (US)

( * ) Notice: Subject to any disclaimer, the term of this patent is extended or adjusted under 35 U.S.C. 154(b) by 122 days.

(21) Appl. No.: 16/859,472

(22) Filed: Apr. 27, 2020

(65) Prior Publication Data
US 2021/0334385 A1 Oct. 28, 2021

(51) Int. Cl.
*G06F 21/57* (2013.01)
*H04L 29/06* (2006.01)

(52) U.S. Cl.
CPC ........ *G06F 21/577* (2013.01); *H04L 63/1433* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 8,646,087 | B2 * | 2/2014 | Pistoia | G06F 21/57 726/25 |
| 11,030,318 | B1 * | 6/2021 | Shavro | G06F 21/52 |
| 2013/0007887 | A1 * | 1/2013 | Haviv | H04L 63/1433 726/25 |
| 2013/0139267 | A1 * | 5/2013 | Amit | H04L 67/02 726/25 |
| 2014/0165204 | A1 * | 6/2014 | Williams | H04L 63/02 726/25 |

OTHER PUBLICATIONS

Atlidakis, Vaggelis et al., "RESTler: Stateful Rest API Fuzzing"; 2019 IEEE/ACM: Proceedings of the 41st International Conference on Software Engineering (ICSE); pp. 748-758; May 25-31, 2019 (11 pages).

(Continued)

*Primary Examiner* — Fatoumata Traore
(74) *Attorney, Agent, or Firm* — Ferguson Braswell Fraser Kubasta PC

(57) ABSTRACT

A method may include sending, to an entry point of an instrumented web application, a first request including a first value of a parameter. The first value may correspond to a first vulnerability category. The method may further include receiving, from the instrumented web application, first taint analysis results, determining that the first taint analysis results include a sink function corresponding to a second vulnerability category, and sending, to the entry point, a second request including a second value of the parameter. The second value may correspond to the second vulnerability category. The method may further include receiving, from the instrumented web application and in response to sending the second request, second taint analysis results including the sink function, and detecting, in the instrumented web application and using the second taint analysis results, a vulnerability corresponding to the sink function and the second vulnerability category.

20 Claims, 6 Drawing Sheets

(56) References Cited

OTHER PUBLICATIONS

Doupé, Adam et al., "Enemy of the State: A State-Aware Black-Box Web Vulnerability Scanner"; Security'12: Proceedings of the 21st USENIX conference on Security Symposium; pp. 523-538; Aug. 8-10, 2012 (16 pages).
Duchene, Fabien et al., "KameleonFuzz: Evolutionary Fuzzing for Black-Box XSS Detection"; CODASPY '14 Proceedings of the 4th ACM conference on Data and application security and privacy; pp. 37-48; Mar. 3-5, 2014 (12 pages).

* cited by examiner

GREYBOX FUZZING FOR WEB APPLICATIONS

CROSS-REFERENCE TO RELATED APPLICATIONS

This application is related to: U.S. patent application Ser. No. 16/676,760, filed Nov. 7, 2019, entitled "APPLICATION PROGRAMMING INTERFACE SPECIFICATION INFERENCE" and U.S. patent application Ser. No. 16/058,876, filed Aug. 8, 2018, entitled "STAGED DYNAMIC TAINT FLOW INFERENCE" for the purposes of disclosure material depending on the subject matter disclosed.

BACKGROUND

Web applications are vulnerable to various types of attacks. Web application fuzzing, also known as security scanning, encompasses techniques and tools to identify vulnerabilities in web applications by sending malformed or malicious inputs and then monitoring abnormal behaviors (e.g., error codes, error messages, leaked information, crashes, or reflected input payloads). Fuzzers may come in three types: blackbox, greybox, and whitebox, according to how deeply the fuzzer penetrates into the internals of the web application. Whitebox fuzzers use a combination of concrete and symbolic execution to explore the web application symbolically, and derive inputs to cover new execution paths. However, whitebox testing may be computationally expensive. Blackbox fuzzers operate on input and output only, and excel at generating massive amounts of input in a short amount of time. Because blackbox fuzzers lack visibility into the program's internal states, blackbox fuzzers often struggle to generate input that will bypass the program's internal sanitization checks, resulting in incomplete testing of the web application. Grammar- and model-based blackbox fuzzers require the security testers to supply domain-specific knowledge about the web application, in the form of an input grammar or model, to guide the input-generation process and bypass shallow sanitization checks. Greybox fuzzers use a combination of blackbox and lightweight whitebox techniques.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including sending, to an entry point of an instrumented web application executing on a web server, a first request including a first value of a parameter. The first value corresponds to a first vulnerability category. The method further includes receiving, from the instrumented web application and in response to sending the first request, first taint analysis results, determining that the first taint analysis results include a sink function corresponding to a second vulnerability category, and in response to determining that the first taint analysis results include the sink function corresponding to the second vulnerability category, sending, to the entry point, a second request including a second value of the parameter. The second value corresponds to the second vulnerability category. The method further includes receiving, from the instrumented web application and in response to sending the second request, second taint analysis results including the sink function, and detecting, in the instrumented web application and using the second taint analysis results, a vulnerability corresponding to the sink function and the second vulnerability category.

In general, in one aspect, one or more embodiments relate to a system including a computer processor, a web server configured to instrument a web application to generate taint analysis results, and a repository configured to store a first request including a first value of a parameter and a second request including a second value of the parameter. The first value corresponds to a first vulnerability category. The second value corresponds to a second vulnerability category. The system further includes a fuzzer executing on the computer processor and configured to send, to the web server and at an entry point of the instrumented web application, the first request, receive, from the instrumented web application and in response to sending the first request, first taint analysis results, determine that the first taint analysis results include a sink function corresponding to the second vulnerability category, in response to determining that the first taint analysis results include the sink function corresponding to the second vulnerability category, send, to the entry point, the second request, receive, from the instrumented web application and in response to sending the second request, second taint analysis results including the sink function, and detect, in the instrumented web application and using the second taint analysis results, a vulnerability corresponding to the sink function and the second vulnerability category.

In general, in one aspect, one or more embodiments relate to a method including sending, to an entry point of an instrumented web application executing on a web server, requests including a values of a parameter. The values correspond to a first vulnerability category. The method further includes receiving, from the instrumented web application and in response to sending the first request, coverage metrics, determining that the total number of requests has reached a request threshold without increasing the coverage of the instrumented web application, in response to determining that the total number of requests has reached the request threshold without increasing the coverage, determining a second vulnerability category, and sending, to the entry point, a new request including a new value of the parameter. The new value corresponds to the second vulnerability category. The method further includes receiving, from the instrumented web application and in response to sending the new request, taint analysis results including a sink function corresponding to the second vulnerability category, and detecting, in the instrumented web application and using the taint analysis results, a vulnerability corresponding to the sink function and the second vulnerability category.

Other aspects of the invention will be apparent from the following description and the appended claims.

DETAILED DESCRIPTION

Figure 1:
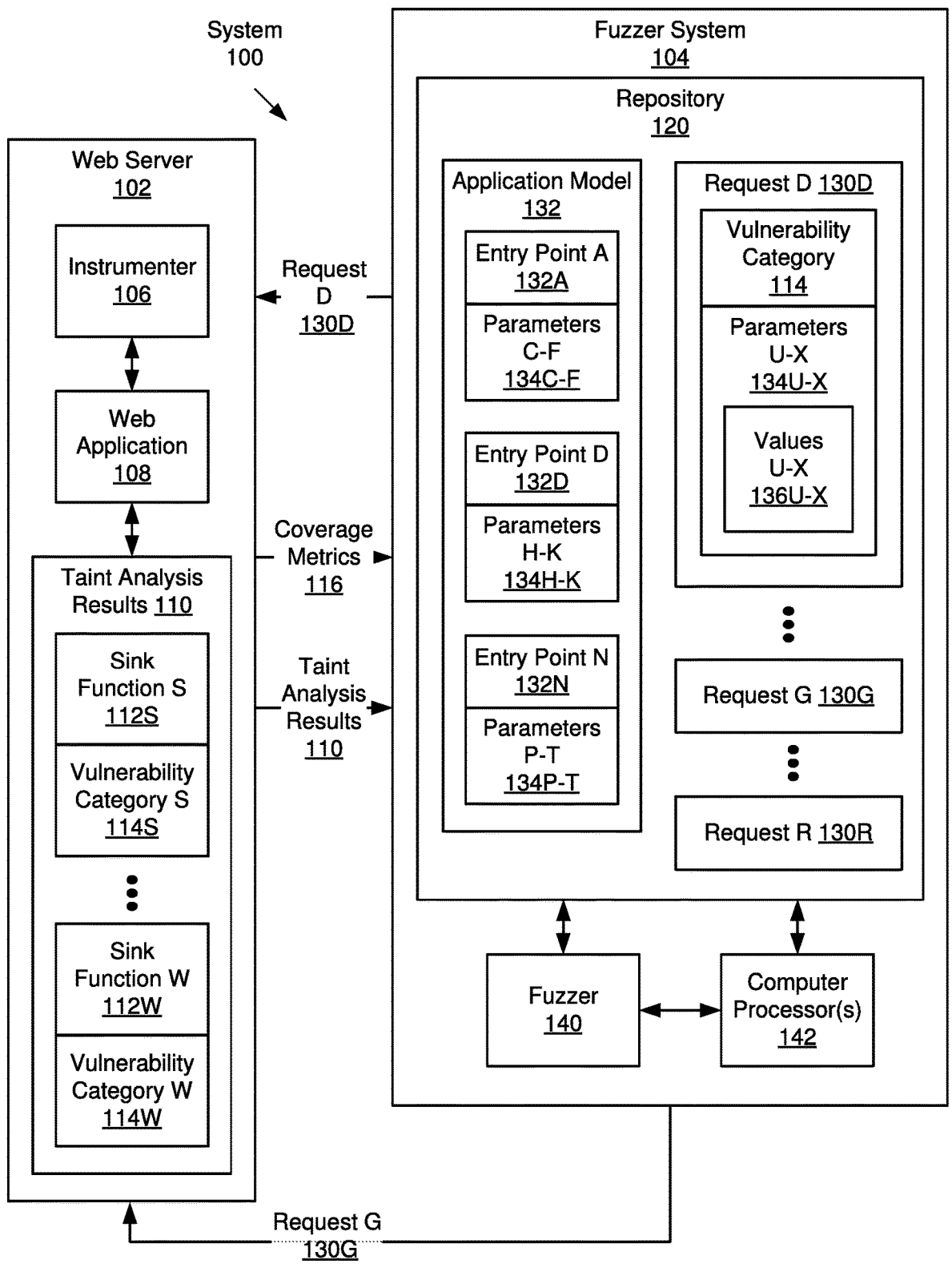
FIG. 1 shows a flow diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to fuzzing a web application. In one or more embodiments, a fuzzer sends requests that include values of a parameter to an entry point of the web application. The values may correspond to a first vulnerability category. A vulnerability category is a weakness in the web application that may be exploited by a malicious actor to perform unauthorized actions. Examples of vulnerability categories include: Structured Query Language injection (SQLi), remote code execution (RCE), etc.

The web application may be instrumented to provide taint analysis results and/or coverage metrics in response to each request. The taint analysis results may include sink functions that correspond to vulnerability categories. A sink function may be a function that accesses a security-sensitive resource. Coverage metrics quantify the types of instructions executed in the web application. Examples of coverage metrics may include: function coverage, statement coverage, branch coverage, etc.

When the taint analysis results include a sink function corresponding to a second (i.e., different) vulnerability category, then a request whose values correspond to the second vulnerability category may then be sent to the entry point. In other words, the fuzzer may stop sending requests targeting the first vulnerability category and instead begin sending requests targeting the second vulnerability category. The goal of this heuristic is to trigger more vulnerabilities using fewer requests by focusing the fuzzing requests on vulnerability categories that correspond to taint analysis results. In one or more embodiments, the vulnerability is confirmed by observing a side-effect of executing the instrumented web application in response to sending a request whose values correspond to the second vulnerability category. For example, the side-effect may be printing a string, or causing the instrumented web application to sleep for a specific amount of time, etc.

In one or more embodiments, when the total number of requests corresponding to a vulnerability category sent to the entry point reaches a request threshold without increasing the coverage of the instrumented web application, the fuzzer discontinues sending requests targeting the vulnerability category. The goal of this heuristic is to discontinue the exploration of vulnerability categories when the fuzzing effort is not progressing, where progress is measured by increasing coverage of the instrumented web application. Instead, the fuzzer determines a different vulnerability category and begins sending requests targeting the different vulnerability category. The aforementioned heuristics may improve the efficiency of fuzzing by focusing fuzzing requests on the vulnerability categories that are more likely to trigger the detection of vulnerabilities in the instrumented web application.

FIG. 1 shows a system (100) in accordance with one or more embodiments of the invention. As shown in FIG. 1, the system (100) includes a web server (102) and a fuzzer system (104). In one or more embodiments, the web server (102) and/or the fuzzer system (104) take the form of the computing system (500) described with respect to FIG. 5A and the accompanying description below or take the form of the client device (526) described with respect to FIG. 5B.

In one or more embodiments, the web server (102) is a server for a specific website. The web server (102) may execute a web application (108) or any application that is configured to execute on the web server (102). The web application (108) may include functionality to receive requests (e.g., requests (130D, 130G, 130R)) over a network (e.g., network (520)) from clients. In one or more embodiments, the web application (108) is a collection of source code including various software components. The web application (108) may include statements written in a programming language, or intermediate representation (e.g., byte code). The web application (108) may be transformed by a compiler into binary machine code. Compiled machine code may be executed by a computer processor (502) in order to execute software components generated from the web application (108). The web application (108) may be any collection of object code (e.g., machine code generated by a compiler) or another form of the web application (108).

The web server (102) may include an instrumenter (106). The instrumenter (106) is a software component that includes functionality to modify the web application (108) to generate taint analysis results (110), coverage metrics (116), and/or additional information regarding the execution and/or performance of the web application (108). The instrumented web application (108) may include functionality to send taint analysis results (110) and/or coverage metrics (116) to a fuzzer (140). For example, the instrumented web application (108) may send the taint analysis results (110) and coverage metrics (116) to the fuzzer (140) in response to receiving a request (130D) from the fuzzer (140).

In one or more embodiments, taint analysis results (110) include sink functions (112S, 112W). A sink function (112S) may be a function that accesses a security-sensitive resource of a computer system (e.g., web server (102)) that executes the web application (108). The sink functions (112S, 112W) may correspond to vulnerability categories (114S, 114W). A vulnerability category (114S) is a weakness in the web application (108) that may be exploited by a malicious actor to perform unauthorized actions within a computer system that executes the web application (108). Examples of vulnerability categories include: Structured Query Language injection (SQLi), remote code execution (RCE), cross-site scripting (XSS), denial of service (DoS), etc.

In one or more embodiments, coverage metrics (116) are metrics that quantify the types of instructions executed in the web application (108). Examples of coverage metrics (116) may include: function coverage (how many functions defined in the web application (108) have been called), statement coverage (how many statements in the web application (108) have been executed), branch coverage (how many branches of control structures, such as "if" statements, in the web application (108) have been executed), line coverage (how many of lines of source code in the web application (108) have been tested), etc.

Continuing with FIG. 1, in one or more embodiments, the fuzzer system (104) includes a repository (120), a fuzzer (140), and computer processor(s) (142). In one or more embodiments, the fuzzer (140) includes functionality to generate requests (130D, 130G, 130R) using an application model (132). The fuzzer (140) may include functionality to send the requests (130D, 130G, 130R) to the web application (108) in order to fuzz the web application (108). The fuzzer (140) may include functionality to store the requests (130D, 130G, 130R) (e.g., instead of storing the requests in the repository (120)). The fuzzer (140) may include functionality to store the application model (132). The fuzzer (140) may include functionality to receive taint analysis results (110) and coverage metrics (116) from the instrumented web application (108).

In one or more embodiments, the repository (120) may be any type of storage unit and/or device (e.g., a file system, database, collection of tables, or any other storage mechanism) for storing data. Further, the repository (120) may include multiple different storage units and/or devices. The multiple different storage units and/or devices may or may not be of the same type or located at the same physical site.

In one or more embodiments, the repository (120) includes requests (130D, 130G, 130R) and an application model (132). The application model (132) is a structure that represents features of the web application (108) that may be relevant to testing (e.g., fuzzing) the web application (108). In one or more embodiments, the application model (132) includes entry points (132A, 132D, 132N). An entry point (132A) may be a source code location in the web application (108) where the web application (108) is invoked by code external to the web application (108). An entry point (132A) may correspond to an action and a universal resource locator (URL) path. The action may be performed on a resource identified by the URL path. For example, the action may correspond to a verb used in a communications protocol. Continuing this example, an action may be a verb in the HyperText Transfer Protocol (HTTP) protocol (e.g., DELETE, POST, GET, PUT, PATCH, etc.). The URL path may identify a resource (e.g., a directory in a file system) accessible over a computer network (e.g., computer network (520)). Examples of URL paths may be "/admin", "/users", etc.

In one or more embodiments, precedence dependencies between entry points specify that one entry point be invoked before another entry point. For example, starting with an empty cart at an e-commerce website, it may be necessary to first add an item to the cart by sending a "POST/add/itemId" request before checking out by issuing a "GET/checkout" request. That is, the entry point corresponding to checking out the cart may be invoked only after the entry point corresponding to adding an item to the cart has been invoked.

The entry points (132A, 132D, 132N) may correspond to parameters (134C-F, 134H-K, 134P-T). The parameters (134C-F) are arguments received at the entry point (132A). One of the parameters (134C-F) may be a path parameter corresponding to the URL path. For example, a path parameter may be "id", where the value of the path parameter may identify a specific user identifier relative to the "/users" URL path. Parameters (134C-F) may correspond to a location (e.g., a location in a request (130D)). For example, the location may be "path", "query", "header", "cookie", etc. Parameters (134C-F) may correspond to a type. For example, the type corresponding to a parameter may be specified in an application model (132).

The application model (132) may be a manually generated model. Alternatively, in one or more embodiments, the application model (132) is an application programming interface (API) specification for an API of the web application (108). For example, the API may be a representational state transfer (REST) API. The API specification may describe the input-output behavior of an API. The API specification may be represented using a specific format. For example, an API specification may be represented in the OpenAPI 2.0 (formerly called Swagger) format. The API specification may include, for an entry point, the names, types and/or other attributes of parameters included in the observed requests. For example, if the value of a parameter in one or more observed requests is an integer, then it may be inferred that the type of the parameter is "integer".

In one or more embodiments, a request (130D) is a structured input sent from the fuzzer (140) to the web application (108). For example, the request (130D) may be a HyperText Transfer Protocol (HTTP) request sent to an entry point (132A) of the web application (108). The structure of a request (130D) may be based on the application model (132). A request (130D) may include values (136U-X) for parameters (134U-X). For example, the parameters (134U-X) of the request (130D) may correspond to an entry point (132A) of the application model (132). In one or more embodiments, the values (136U-X) correspond to a vulnerability category (114). Continuing this example, the values (136U-X) may be malformed and/or malicious in an attempt to fuzz the web application (108) by triggering abnormal behaviors (e.g., error codes, error messages, leaked information, crashes, or reflected input payloads). Further continuing this example, a collection of predefined values may be compiled for each vulnerability category (114). The collection of predefined values may be used in requests (130D, 130G, 130R) sent to the web application (108) by the fuzzer (140) to focus fuzzing on specific vulnerability categories (114). For example, values corresponding to the Structured Query Language injection (SQLi) vulnerability category may be Structured Query Language (SQL) statements that execute arbitrary (e.g., injected) code that has a malicious effect.

In one or more embodiments, the computer processor(s) (142) takes the form of the computer processor(s) (502) described with respect to FIG. 5A and the accompanying description below. In one or more embodiments, the computer processor (142) includes functionality to execute the fuzzer (140).

While FIG. 1 shows a configuration of components, other configurations may be used without departing from the scope of the invention. For example, various components may be combined to create a single component. As another example, the functionality performed by a single component may be performed by two or more components.

Figure 2:
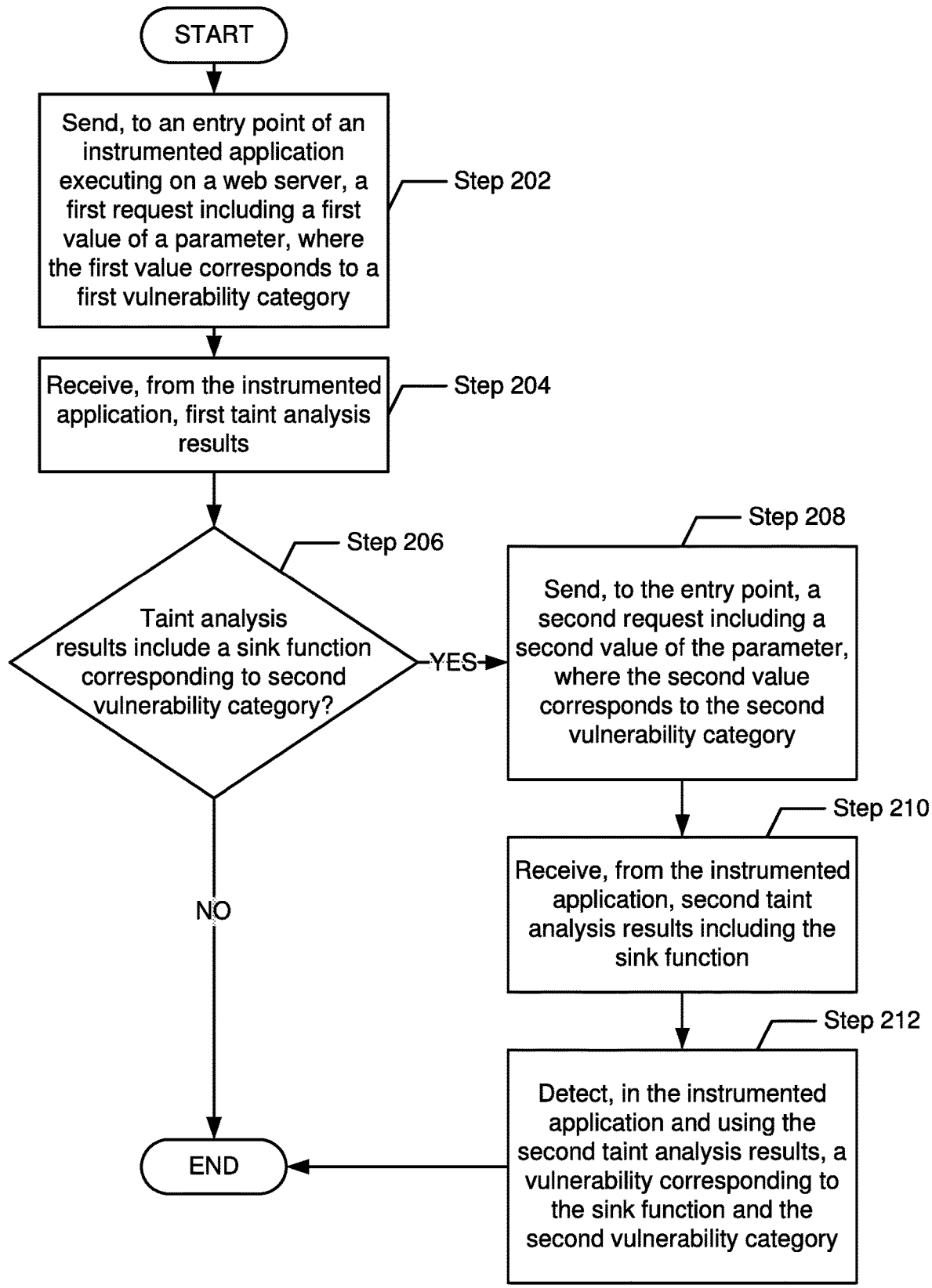
FIG. 2 and FIG. 3 show flowcharts of a method in accordance with one or more embodiments of the invention.

FIG. 2 shows a flowchart in accordance with one or more embodiments of the invention. The flowchart depicts a process for fuzzing a web application. One or more of the steps in FIG. 2 may be performed by the components (e.g., the fuzzer system (104) and the web application (108) of the web server (102)), discussed above in reference to FIG. 1. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a first request including a first value of a parameter is sent to an entry point of an instrumented web application executing on a web server. The first value may correspond to a first vulnerability category. For example, the first vulnerability category may be "file system vulnerability". Continuing this example, the first value may be designed to avoid various file system safeguards in the web application in order to trigger undesirable behavior associated with file systems.

In one or more embodiments, the fuzzer determines the entry point and the parameter using an application model for the instrumented web application. The application model may be based on an API specification inferred by dynamically observing the behavior of the web application in response to requests processed by the web application. For example, entry points may be inferred using observations of the behavior of the web application in response to the requests. The requests may be sent to the web application by various clients. Alternatively, the fuzzer may send requests to the web application. For example, the fuzzer may send requests to the web application using a test suite for the web application.

Alternatively or additionally, the API specification may be based on a static analysis of the source code of the web application. The static analysis may analyze the source code without executing the web application. For example, the source code of the web application may be analyzed by a code analyzer of the fuzzer system. The static analysis may generate an API specification (e.g., a Swagger snippet) that may be merged with the dynamically inferred API specification.

In Step 204, first taint analysis results are received from the instrumented web application in response to sending the first request. The first taint analysis results include a flow from at least a portion of the first value to a sink function. The taint analysis results may be generated using any taint analysis technique. For example, the taint analysis technique may be a lightweight inferential technique based on correlating sink values received at sink functions with source values at source points in the web application where potential attacker-controlled input may enter. For example, a taint inference may be performed by determining a substring relationship between a source value and a sink value. As another example, a taint inference may be performed by determining a similarity score (e.g., based on an edit distance) between the source value and the sink value. If necessary, the taint inference may be followed by one or more taint checks that analyze the runtime behavior of the web application. One example of a taint check is mutating (e.g., at random) the source value, re-executing the web application, and observing how the sink value changes in response to the mutated source value. For example, if the sink value is unchanged when the web application is re-executed, the potential taint flow may be labeled as a false positive because mutating the source value had no impact on the sink value, and thus the sink value does not appear to be attacker-controlled.

Another example of a taint check is analyzing an execution trace between the locations of the source value and the sink value in the web application. The taint check may analyze the execution trace to identify a series of operations that transform the source value into the sink value. The trace check may identify potentially tainted operations in the execution trace whose arguments match the source value based on a substring relationship and/or a similarity relationship.

If, in Step 206 it is determined that the first taint analysis results include a sink function corresponding to a second vulnerability category, then Step 208, Step 210, and Step 212 are executed. In one or more embodiments, the first taint analysis results indicate that at least a portion of the first value reached the sink function. Because the vulnerability category corresponding to the first value (i.e., the first vulnerability category) does not match the vulnerability category to the corresponding to the sink function (i.e., the second vulnerability category), the first value is unlikely to trigger an observable behavior that can help confirm a potential vulnerability. For example, the first value may represent malformed input relative to the second vulnerability category. Continuing this example, the first value may be designed to exploit a file system vulnerability (e.g., the first vulnerability category) and the sink function may correspond to a Structured Query Language injection (SQLi) vulnerability (e.g., the second vulnerability category). Further continuing this example, the sink function may attempt to execute its input argument as an SQL query, resulting in the generation of an error message because the first value is not a syntactically valid SQL query.

In Step 208, a second request including a second value of the parameter is sent to the entry point. In one or more embodiments, the second value matches the second vulnerability category. By sending a request targeting the second vulnerability category (i.e., the vulnerability category identified in the first taint analysis results), the fuzzer may be more likely to trigger an observable vulnerability (see description of Step 212 below) while reducing the number of fuzzing requests sent to the instrumented web application. Continuing the example above, the second value may be a syntactically valid SQL query designed to trigger observable malicious behavior.

In Step 210, second taint analysis results including the sink function are received from the instrumented web application (see description of Step 204 above).

In Step 212, a vulnerability is detected in the instrumented web application using the second taint analysis results. The vulnerability corresponds to the sink function and the second vulnerability category. In one or more embodiments, the vulnerability is confirmed by observing a side-effect of executing the instrumented web application in response to sending the second request. For example, the side-effect may be printing a string, causing the instrumented web application to sleep for a specific amount of time, or manifesting malicious behavior, depending on the executable command(s) embedded in the second value of the second request.

In one or more embodiments, the fuzzer repeats the execution of the process shown in FIG. 2 for each vulnerability category, and for each parameter of each entry point of the instrumented web application. The order in which the fuzzer fuzzes the entry points may be based on precedence dependencies between entry points among the entry points. For example, if entry point E (e.g., cart checkout) depends on entry point F (e.g., add item to cart), then the fuzzer fuzzes entry point F before fuzzing entry point E.

The precedence dependencies among entry points may be identified by analyzing execution logs and/or automated crawling sessions corresponding to the instrumented web application. For example, execution logs may be collected by the web server hosting the instrumented web application. Continuing this example, the execution logs may be collected in response to the execution of functional test suites for the instrumented web application, because it may be assumed that the order in which the test suites exercise the entry points complies with the precedence dependencies among entry points. For example, it is unlikely for a functional test suite to test for anomalous behavior, such as checking out an empty cart. In addition, it may be assumed that the client-side interface of the instrumented web application encodes its server-side state. For example, the client-side interface might not display the checkout button or might deactivate the checkout button until the cart includes at least one item. Thus, the fuzzer system may capture precedence dependencies among the entry points of the instrumented web application using a state-aware crawler to exercise the entry points of the instrumented web application and analyze the corresponding states.

Figure 3:
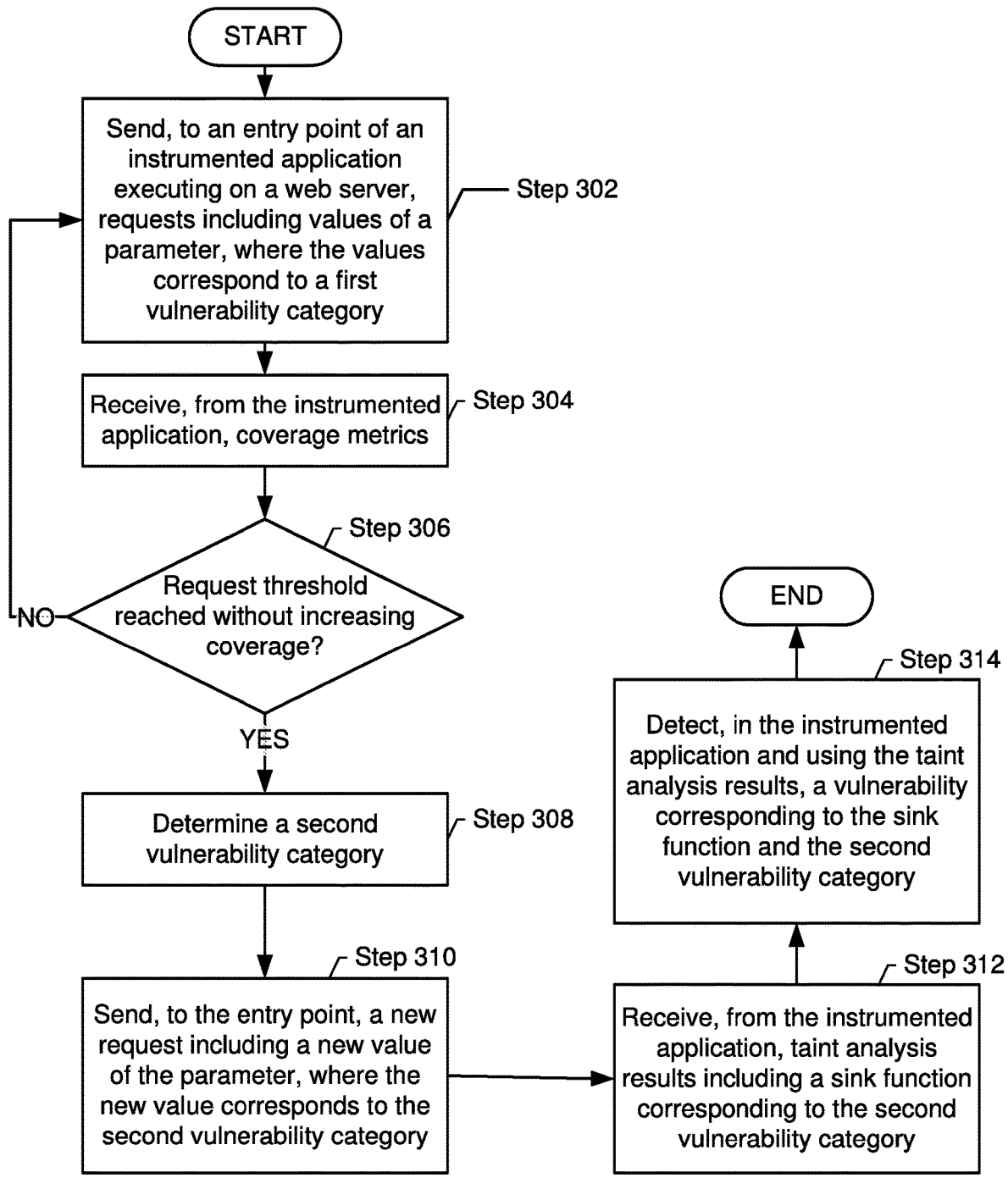

FIG. 3 shows a flowchart in accordance with one or more embodiments of the invention. The flowchart depicts a process for fuzzing a web application. One or more of the steps in FIG. 3 may be performed by the components (e.g., the fuzzer system (104) and the web application (108) of the web server (102)), discussed above in reference to FIG. 1. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 302, requests including values of a parameter are sent to an entry point of an instrumented web application executing on a web server. The values corresponds to a first vulnerability category (see description of Step 202 above). In one or more embodiments, the fuzzer increments a request counter each time the fuzzer sends a request to the instrumented web application.

In Step 304, coverage metrics are received from the instrumented web application in response to sending the requests. For example, the coverage metrics may quantify the number of functions called, the number of statements executed, the number of branches executed, or the number of lines of source code tested in the instrumented web application, etc.

If, in Step 306 it is determined that the total number of requests has reached a request threshold without increasing the coverage of the instrumented web application, then Step 308, Step 310, Step 312, and Step 314 are executed. In one or more embodiments, the fuzzer determines whether the request threshold has been reached by comparing the request counter to the request threshold.

Otherwise, if Step 306 determines that either the total number of requests in the requests has not reached the request threshold, or that the coverage of the instrumented web application has increased, then Step 302 above is again executed to send additional requests to the entry point. The additional requests may include values for the parameter that correspond to the first vulnerability category. If the coverage of the instrumented web application has increased, then the fuzzer may, before repeating the execution of Step 302, reset the request counter to zero, in order to fully explore the newly covered code with additional requests. For example, the number of additional requests may be equal to the request threshold.

In Step 308, a second vulnerability category is determined. For example, the fuzzer may determine the second vulnerability category to be any vulnerability category that has not been explored for the parameter at the entry point (e.g., by sending requests whose parameter values match the vulnerability category). In one or more embodiments, the fuzzer determines the second vulnerability category using a ranking of the vulnerability categories. Alternatively, fuzzer may determine the second vulnerability category by selecting a vulnerability category at random.

If each vulnerability category has been explored, the fuzzer may repeat the process of FIG. 3 for the entry point using another parameter. If each parameter has been explored at the entry point, the fuzzer may repeat the process of FIG. 3 for another entry point (see previous discussion of precedence dependencies among entry points following the description of FIG. 2 above).

In Step 310, a new request including a new value of the parameter is sent to the entry point of the instrumented web application. The new value may match the second vulnerability category. That is, by discontinuing sending requests whose values of the parameter correspond to the first vulnerability category, the fuzzer may be more likely to trigger a vulnerability while reducing the number of requests sent to the instrumented web application. The goal of this heuristic is to discontinue the exploration of vulnerability categories when the fuzzing effort is not increasing coverage of the instrumented web application. For example, there may be a large number of predefined requests corresponding to each vulnerability category, and focusing the fuzzing requests sent to the instrumented web application on the most promising vulnerability categories may increase the number of vulnerabilities detected while reducing the number of fuzzing requests.

In Step 312, taint analysis results including a sink function corresponding to the second vulnerability category are received from the instrumented web application in response to sending the new request (see description of Step 204 above).

In Step 314, a vulnerability is detected in the instrumented web application using the taint analysis results (see description of Step 212 above).

Figure 4A:
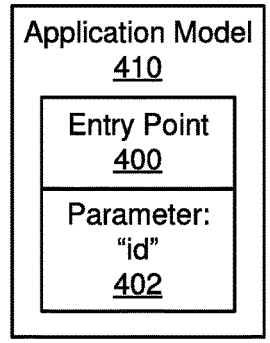
FIG. 4A and FIG. 4B show examples in accordance with one or more embodiments of the invention.
Figure 4B:
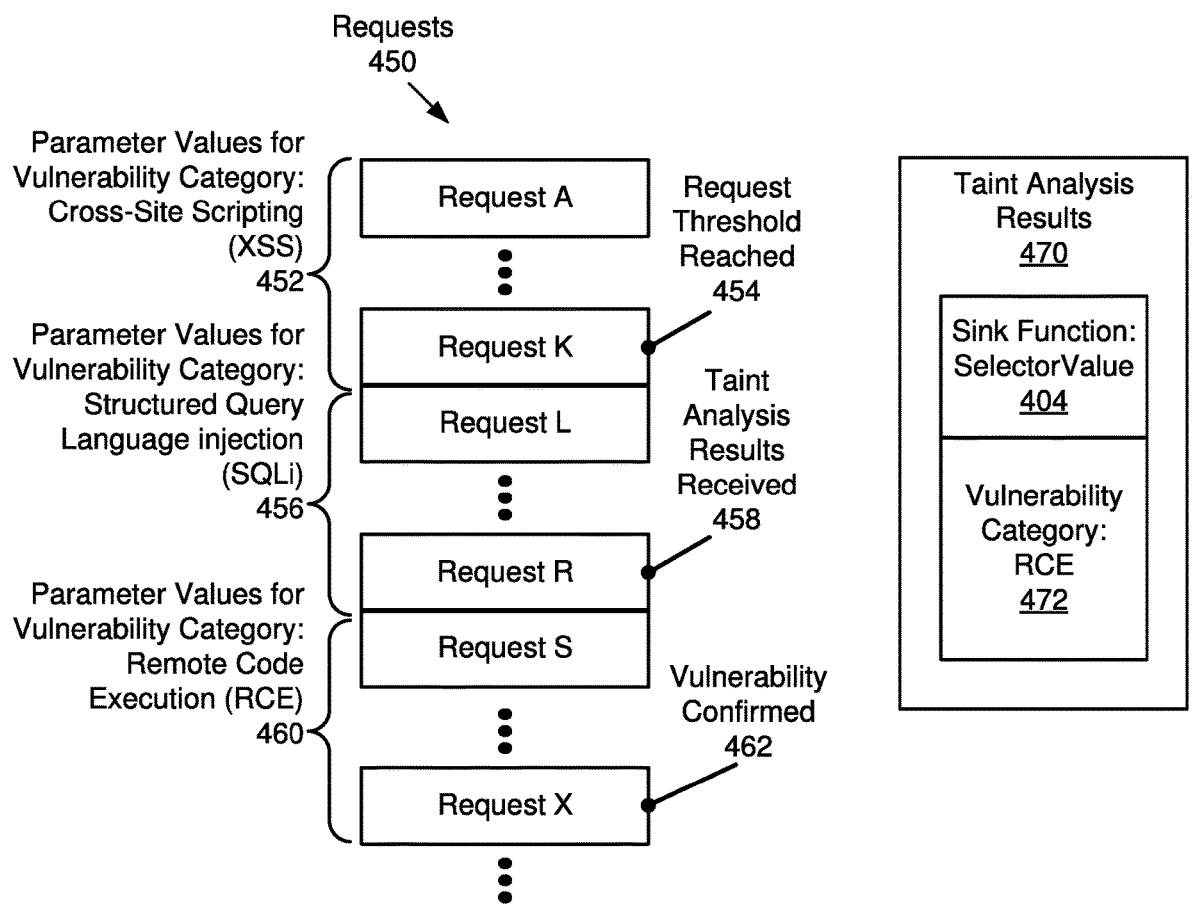

FIG. 4A and FIG. 4B show an implementation example(s) in accordance with one or more embodiments. The implementation example(s) are for explanatory purposes only and not intended to limit the scope of the invention. One skilled in the art will appreciate that implementation of embodiments of the invention may take various forms and still be within the scope of the invention.

FIG. 4A shows an implementation of an entry point (400) in the MarsDB library that includes a parameter "id" (402) ((134C-F, 134H-K, 134P-T, 134U-X) in FIG. 1) and a sink function "selectorValue" (404) ((112S, 112W) in FIG. 1). The entry point corresponds to the universal resource locator (URL) "/rest/track-order/{id}". The fuzzer system obtains an application model (410) for a portion of the MarsDB library that includes the implementation of the entry point (400). The application model (410) indicates that the entry point (400) has the parameter "id" (402). Parameter "id" (402) receives a value from an external source, and thus parameter "id" (402) is attacker-controllable. The sink function "selectorValue" (404) is dynamically constructed from the value of the attacker-controllable input parameter "id" (402). Thus, there is a remote code execution (RCE) vulnerability at the sink function "selectorValue" (404).

FIG. 4B shows a series of requests (450) ((130D, 130G, 130R) in FIG. 1) sent by the fuzzer to fuzz the parameter "id" (402) at the entry point (400). The series of requests (450) includes parameter values (452, 456, 460) ((136U-X) in FIG. 1) corresponding to specific vulnerability categories. Initially, the fuzzer sends, to the MarsDB library, requests A-K whose parameter values (452) correspond to the vulnerability category cross-site scripting (XSS). The MarsDB library is instrumented to provide coverage metrics and taint analysis results. In this case, the coverage metrics are the number of conditional branches executed in the MarsDB library. The fuzzer receives, from the MarsDB library, coverage metrics in response to requests A-K that do not indicate an increase in the coverage of the MarsDB library (e.g., relative to a base level of coverage when the MarsDB library is initialized). When the fuzzer sends request K, the request threshold (454) is reached. Because the request threshold (454) is reached and the coverage of the MarsDB library has not increased when sending requests A-K, the fuzzer determines another vulnerability category for subsequent requests. According to a ranking of vulnerability categories, the next vulnerability category is Structured Query Language injection (SQLi). The fuzzer next sends requests L-R whose parameter values (456) correspond to the vulnerability category SQLi. When the fuzzer sends request R, taint analysis results are received (458) indicating that at least a portion of the value of parameter "id" (402) has reached a sink function. The taint analysis results (470) include the sink function "selectorValue" (404), which corresponds to the vulnerability category RCE (472) ((114) in FIG. 1). Because the vulnerability category RCE (472) of the taint analysis results (470) does not match the vulnerability category, SQLi, of request R, the fuzzer is unable to confirm the vulnerability. The fuzzer jumps to the vulnerability category RCE (472) of the taint analysis results (470), and sends requests S-X, whose parameter values (460) correspond to the vulnerability category RCE (472). When the fuzzer sends request X, the vulnerability is confirmed (462) based on an observable side-effect of the MarsDB library processing request X. In this case, the observable side-effect was executing a print statement that was included in the parameter value of request X, thus confirming an attacker's capability to execute arbitrary code included in the value of the parameter "id" (402).

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
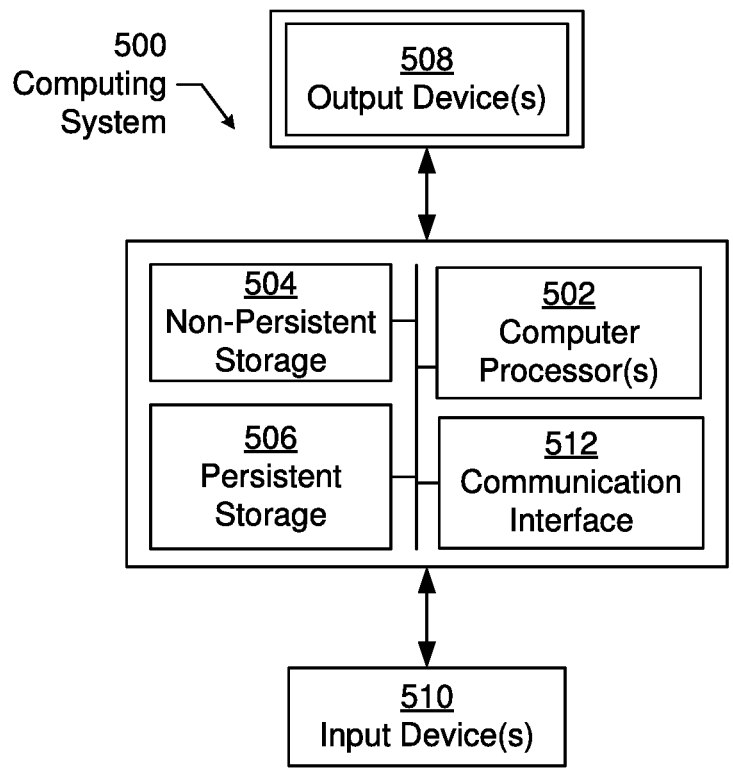
FIG. 5A and FIG. 5B show a flow diagram of computing systems in accordance with one or more embodiments of the invention.
Figure 5B:
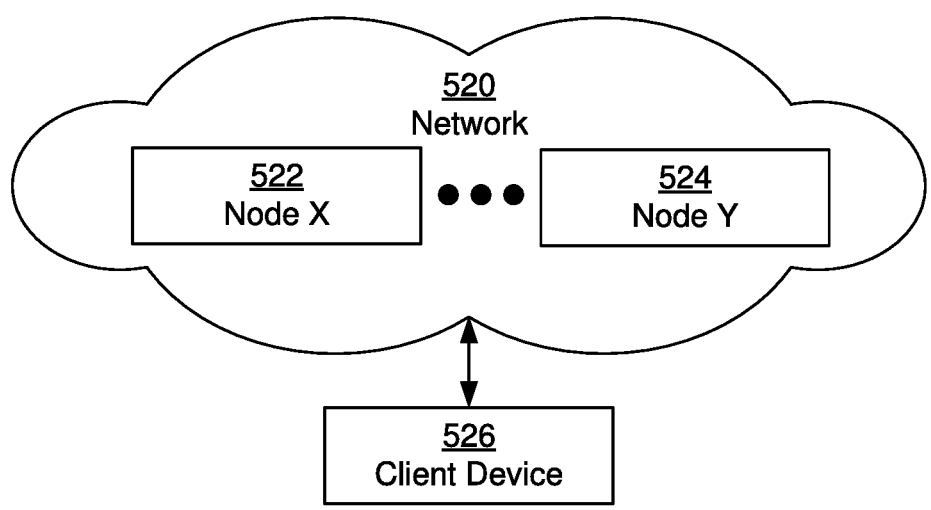

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   sending, to a first entry point of an instrumented web application executing on a web server, a first request comprising a first value of a first parameter, wherein the first value corresponds to a first vulnerability category of a plurality of vulnerability categories;
   receiving, from the instrumented web application and in response to sending the first request, first taint analysis results;
   determining that the first taint analysis results comprise a sink function corresponding to a second vulnerability category of the plurality of vulnerability categories;
   in response to determining that the first taint analysis results comprise the sink function corresponding to the second vulnerability category, sending, to the first entry point, a second request comprising a second value of the first parameter, wherein the second value corresponds to the second vulnerability category;
   receiving, from the instrumented web application and in response to sending the second request, second taint analysis results comprising the sink function; and
   detecting, in the instrumented web application and using the second taint analysis results, a vulnerability corresponding to the sink function and the second vulnerability category.

2. The method of claim 1, wherein the first taint analysis results comprise a flow from at least a portion of the first value to the sink function, and wherein the second taint analysis results comprise a flow from at least a portion of the second value to the sink function.

3. The method of claim 1, further comprising:
   identifying a dependency of a second entry point on the first entry point; and
   sending, to the second entry point, based on the dependency, and after sending the first request, a second request comprising a second value of a second parameter.
4. The method of claim 3, wherein identifying the dependency comprises:
   sending, to the first entry point, a plurality of requests;
   in response to sending the plurality of requests, obtaining a log of the execution of the instrumented web application; and
   extracting, using the log, the dependency.
5. The method of claim 1, further comprising:
   determining, using a model of the instrumented web application, the first entry point and the first parameter.
6. The method of claim 1, further comprising:
   detecting a side-effect resulting from executing the instrumented web application in response to sending the second request; and
   confirming the vulnerability using the side-effect.
7. A system comprising:
   a computer processor;
   a web server configured to instrument a web application to generate taint analysis results;
   a repository configured to store:
      a first request comprising a first value of a first parameter, wherein the first value corresponds to a first vulnerability category of a plurality of vulnerability categories, and
      a second request comprising a second value of the first parameter, wherein the second value corresponds to a second vulnerability category of the plurality of vulnerability categories; and
   a fuzzer, executing on the computer processor and configured to:
      send, to the web server and at a first entry point of the instrumented web application, the first request,
      receive, from the instrumented web application and in response to sending the first request, first taint analysis results,
      determine that the first taint analysis results comprise a sink function corresponding to the second vulnerability category,
      in response to determining that the first taint analysis results comprise the sink function corresponding to the second vulnerability category, send, to the first entry point, the second request,
      receive, from the instrumented web application and in response to sending the second request, second taint analysis results comprising the sink function, and
      detect, in the instrumented web application and using the second taint analysis results, a vulnerability corresponding to the sink function and the second vulnerability category.
8. The system of claim 7, wherein the first taint analysis results comprise a flow from at least a portion of the first value to the sink function, and wherein the second taint analysis results comprise a flow from at least a portion of the second value to the sink function.
9. The system of claim 7, wherein the fuzzer is further configured to:
   identify a dependency of a second entry point on the first entry point, and
   send, to the second entry point, based on the dependency, and after sending the first request, a second request comprising a second value of a second parameter.
10. The system of claim 9, wherein the fuzzer is further configured to identify the dependency by:
    sending, to the first entry point, a plurality of requests;
    in response to sending the plurality of requests, obtaining a log of the execution of the instrumented web application; and
    extracting, using the log, the dependency.
11. The system of claim 7, wherein the fuzzer is further configured to:
    determine, using a model of the instrumented web application, the first entry point and the first parameter.
12. The system of claim 7, wherein the fuzzer is further configured to:
    detect a side-effect resulting from executing the instrumented web application in response to sending the second request; and
    confirm the vulnerability using the side-effect.
13. A method comprising:
    sending, to a first entry point of an instrumented web application executing on a web server, a first plurality of requests comprising a first plurality of values of a first parameter, wherein the first plurality of values correspond to a first vulnerability category of a plurality of vulnerability categories;
    receiving, from the instrumented web application and in response to sending the first plurality of requests, a plurality of coverage metrics;
    determining that the total number of requests in the first plurality of requests has reached a request threshold without increasing the coverage of the instrumented web application;
    in response to determining that the total number of requests has reached the request threshold without increasing the coverage, determining a second vulnerability category of the plurality of vulnerability categories;
    sending, to the first entry point, a first new request comprising a first new value of the first parameter, wherein the first new value corresponds to the second vulnerability category;
    receiving, from the instrumented web application and in response to sending the first new request, taint analysis results comprising a sink function corresponding to the second vulnerability category; and
    detecting, in the instrumented web application and using the taint analysis results, a vulnerability corresponding to the sink function and the second vulnerability category.
14. The method of claim 13, further comprising:
    receiving, from the instrumented web application and in response to sending the first new request, a first new coverage metric;
    sending, to the first entry point and after sending the first new request, a second new request comprising a second new value of the first parameter;
    receiving, from the instrumented web application and in response to sending the second new request, a second new coverage metric;
    determining that the second new coverage metric exceeds the first new coverage metric; and
    in response to determining that the second new coverage metric exceeds the first new coverage metric, sending, to the first entry point, a second plurality of requests comprising a second plurality of values of the first parameter.

15. The method of claim 14, wherein the total number of requests in the second plurality of requests is at least the request threshold.

16. The method of claim 13, further comprising:
sending, to the first entry point and for the plurality of vulnerability categories, a second plurality of requests, wherein the second plurality of requests comprises the first plurality of requests;
determining that the total number of requests in the subset of the plurality of requests corresponding to each vulnerability category has reached the request threshold without increasing the coverage of the instrumented web application; and
in response to determining that the total number of requests in the subset of the plurality of requests corresponding to each vulnerability category has reached the request threshold without increasing the coverage, sending, to a second entry point of the web application, a third plurality of requests comprising a third plurality of values of a second parameter.

17. The method of claim 16, further comprising:
identifying a dependency of the second entry point on the first entry point,
wherein the third plurality of requests is sent to the second entry point in response to identifying the dependency of the second entry point on the first entry point, and
wherein the third plurality of requests is sent to the second entry point after sending the second plurality of requests to the first entry point.

18. The method of claim 17, wherein identifying the dependency comprises:
sending, to the first entry point, a plurality of requests;
in response to sending the plurality of requests, obtaining a log of the execution of the instrumented web application; and
extracting, using the log, the dependency.

19. The method of claim 13, further comprising:
determining, using a model of the instrumented web application, the first entry point and the first parameter.

20. The method of claim 13, wherein the taint analysis results comprise a flow from at least a portion of the first new value to the sink function.

* * * * *